May 11, 1954 R. ADLER ET AL 2,678,413

TRANSFORMER

Filed July 28, 1950 3 Sheets-Sheet 1

ROBERT ADLER
JACK E. BRIDGES
*INVENTORS*

BY Francis W. Crotty
THEIR ATTORNEY

ROBERT ADLER
JACK E. BRIDGES
*INVENTORS.*
BY Francis W. Crotty
THEIR ATTORNEY

ROBERT ADLER
JACK E. BRIDGES
*INVENTORS*

BY Francis W. Crotty
THEIR ATTORNEY

Patented May 11, 1954 2,678,413

UNITED STATES PATENT OFFICE 2,678,413

TRANSFORMER

Robert Adler, Northfield, and Jack E. Bridges, Chicago, Ill., assignors to Zenith Radio Corporation, a corporation of Illinois Application July 28, 1950, Serial No. 176,258

10 Claims. (Cl. 317—215)

This invention relates to transformers for use in television receivers and the like, and more particularly to sweep-signal output transformers for coupling the sweep-signal output stage of a television receiver to a beam-deflection element and to an anode voltage-supply network associated with a cathode-ray image-reproducing device.

In most present-day commercial television receivers, line-frequency sweep-signals are applied to a magnetic-deflection coil associated with a cathode-ray tube by means of a power output stage and a coupling transformer, the secondary winding of which is used to drive the line-frequency yoke winding. It is conventional practice, when such a sweep-signal output system is used, to provide a rectifier or damper diode directly in shunt with the yoke winding to suppress transient or shock-excited oscillations which may appear across the yoke and cause undesirable velocity modulation of the line-frequency scanning. The provision of a damper diode effectively suppresses such undesirable transient oscillations or ringing and insures a substantially constant scanning velocity.

In the copending application of Robert Adler, Serial No. 129,554, filed November 26, 1949, for "Electron-Discharge Devices and Circuits," and assigned to the present assignee, there is disclosed and claimed a novel sweep-signal generator employing a bidirectional electron-discharge device which operates as an electronic switch to short-circuit the primary winding of the output transformer during trace intervals, and which is rendered non-conductive during retrace intervals so that a current of substantially sawtooth waveform is impressed on the deflection yoke. It is particularly convenient in a circuit of this type to utilize a tapped portion of the output transformer primary winding as the yoke secondary, or in other words, to use an autotransformer to couple the sweep-signal to the deflection yoke. In the absence of a damper diode shunted across the yoke winding, ringing voltages may be superimposed upon the sweep-signal during trace intervals, since the primary winding is effectively short-circuited, but the potential across the yoke secondary is free to vary. Because of leakage inductance and distributed capacity, transient oscillations or ringing voltages of a frequency of the order of 200 kilocycles may appear across the yoke terminals, resulting in velocity modulation of the line-frequency scanning.

Similar considerations apply to other sweep-signal generators known to the art which employ a diode and a triode connected in parallel with reverse polarity across the output transformer primary winding. In this case, also, undesirable ringing voltages, having a frequency of the order of magnitude of ten times higher than the line-scanning frequency, may appear across the deflection yoke, since no damper diode is connected directly across the yoke to suppress transient oscillations. It is partly because of this consideration that such circuits, although well known in the art, have not found commercial acceptance in present-day television receivers.

It is a primary object of the present invention, therefore, to provide a new and improved output-transformer for coupling sweep-signals from the sweep-signal output stage of a television receiver to a beam-deflection element associated with a cathode-ray image-reproducing device.

It is a more particular object of the invention to provide such a new and improved output transformer which is so constructed as substantially to preclude the appearance of high-frequency ringing voltages superimposed upon the output sweep-signals, so that velocity modulation of the cathode-ray scansions is avoided.

It is also customary practice to provide an additional secondary winding in the sweep-signal output transformer for the purpose of developing, during retrace intervals, high-voltage pulses which are subsequently rectified and filtered to provide a steady high-voltage supply for the final anode of the image-reproducing device. It is a further object of the invention to provide a new and improved sweep-signal output transformer, having a high-voltage secondary winding in addition to the sweep-signal output secondary winding, in which the generation of transient oscillations across the deflection yoke is substantially precluded, and which is particularly adapted for use in a sweep-signal generator of the type disclosed in the above-identified copending application or of the type comprising a triode shunted by an inverted diode.

A transformer constructed in accordance with the invention comprises first and second tightly intercoupled windings encompassing a portion of a ferromagnetic core and a third winding concentric with the first and second windings and intercoupled therewith in accordance with the relation $$|\delta_{12}+\delta_{31}-\delta_{32}| \ll \delta_{max}$$

where $\delta_{12}$ is the coupling-deficiency factor (deficiency from unity coupling) between the first and second winding, $\delta_{31}$ is the coupling-deficiency factor between the first and third windings, $\delta_{32}$ is the coupling-deficiency factor between the second and third windings, and $\delta_{max}$ is the largest of the three coupling factors.

The features of the present invention which are believed to be novel are set forth with particularity in the appended claims. The invention, together with further objects and advantages thereof, may best be understood, however, by reference to the following description taken in connection with the accompanying drawings, in the several figures of which like reference numerals indicate like elements, and in which:

Figure 1:
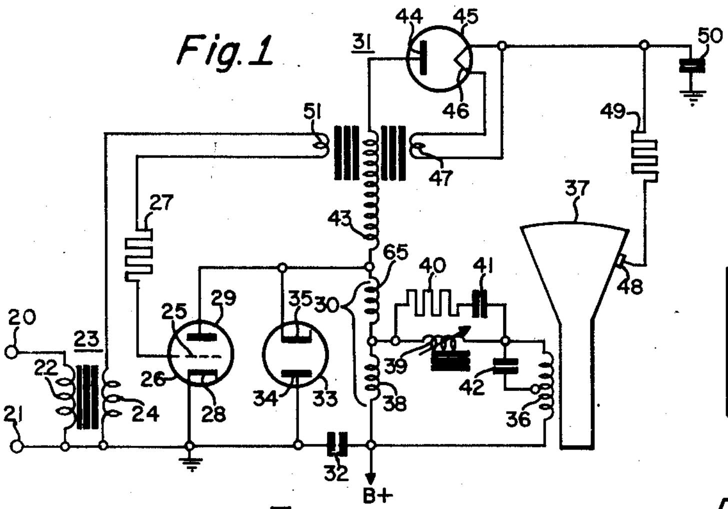
Figure 1 is a schematic circuit diagram of a portion of a television receiver in which the transformer of the present invention is particularly useful.

Figure 1 is a schematic diagram of the line-frequency deflection circuits of a television receiver in which the transformer of the present invention is particularly useful. In the circuit of Figure 1, a pair of input terminals 20 and 21 are connected across the primary winding 22 of an input transformer 23, and terminal 21 is directly connected to ground. The secondary winding 24 of input transformer 23 is coupled to the control grid 25 of electron-discharge device 26 through a current-limiting resistor 27. The cathode 28 of device 26 is directly connected to ground while the anode 29 of device 26 is coupled to a suitable source of unidirectional operating potential, conventionally designated B+, through the primary winding 30 of a sweep-signal output transformer 31; a bypass condenser 32 is provided between B+ and ground. A diode or rectifier device 33 is connected directly in parallel with electron-discharge device 26, but in reverse polarity, the anode 34 of diode 33 being connected to ground while the cathode 35 of diode 33 is connected to anode 29 of device 26.

The line-frequency deflection yoke 36 associated with a cathode-ray image-reproducing device 37 is coupled across the output secondary winding 38 of output transformer 31, a variable inductor 39 being included in series with yoke winding 36 to provide size control if desired. A linearizing network comprising the series combination of a resistor 40 and a condenser 41 may be connected in parallel with size-control inductor 39, and a condenser 42 may be provided in parallel with the upper half of the yoke winding 36 to balance the distributed capacity across the lower half of the yoke winding.

In order to provide high-voltage for the final anode of image-reproducing device 37, an additional secondary winding 43 of output transformer 31, connected in series with primary winding 30, is connected to the anode 44 of a diode or other rectifier device 45, and the filament 46 of diode 45 is heated by means of a low-voltage coil 47 coupled to primary winding 30. Filament 46 is coupled to the contact terminal 48 connected with the final anode (not shown) of image-reproducing device 37 by means of a series resistor 49 and a shunt condenser 50.

In operation, input terminals 20 and 21 are supplied with line-frequency synchronizing-signal pulses, or with signals in synchronism therewith, which may be supplied, for example, from the synchronizing-signal separator stage (not shown) of a television receiver. These pulses are applied to the control grid 25 of device 26 in negative polarity through the secondary winding 24 of input transformer 23, and serve to render device 26 non-conductive during retrace intervals. Device 26 and diode 33 together constitute a bidirectional electronic switch, permitting current to flow in either direction, because of their reverse parallel connection. During the first portion of each trace interval, diode 33 is conductive while device 26 is non-conductive. The current through primary winding 30 decreases at a rate determined substantially by the voltage of the B+ source and the circuit inductance until, near the middle of the trace interval, there is an instant of zero current flow in the circuit. At this point, the diode 33 is rendered non-conductive and device 26 becomes conductive since the potential of its anode 29 becomes positive relative to its cathode 28. The current in the primary winding 30 keeps increasing at a rate determined substantially by the B+ voltage and the circuit inductance until a negative pulse is supplied to control grid 25 at the end of the trace interval to initiate retrace. During retrace intervals, substantially one-half cycle of free oscillation is induced in the output circuit at a frequency determined by the circuit inductance and the distributed capacity, so that the generator is conditioned to commence a subsequent trace interval. The cycle is then repeated.

As is well known, large surge voltages are produced across secondary winding 43 during retrace intervals. These pulses are rectified by device 45 and filtered by resistor 49 and condenser 50 to provide a high-voltage supply for the final anode of image-reproducing device 37.

In order to reduce the driving power requirements, it is desirable to feed back negative pulses from the primary winding to control grid 25 of device 26 as by means of a feedback coil 51. In some applications, it may be desirable to feed back a large enough pulse signal by means of coil 51 to provide self-sustaining operation, in the manner described in detail in the copending application of Jack E. Bridges, Serial No. 129,671, filed November 26, 1949, for "Self-Sustaining Sawtooth Current Generator," now Patent No. 2,591,914, issued April 8, 1952, and assigned to the present assignee.

Sawtooth deflection currents generated in primary winding 30 are transferred to the deflection yoke winding 36 associated with image-reproducing device 37 by means of secondary winding 38 of output transformer 31. Variable inductor 39 provides a convenient size control in a manner well known in the art. Resistor 40 and condenser 41 provide a periodic damping of high-frequency transients which arise from the unbalance of the distributed capacities across the size-control inductor 39 and the yoke winding 36, and by suitably selecting these elements, the aperiodically-damped transient at the beginning of each trace interval, which is superimposed upon the energy supplied to the yoke winding 36, may be made of such amplitude as to provide substantial linearization of the sawtooth waveform. The time constant of the aperiodically-damped circuit determines the portion of each trace interval over which linearization is effected, and the amplitude of the aperiodically-damped transient determines the amount of compensation.

Equivalent operation may be obtained by modifying the circuit of Figure 1 to use a bidirectional electron-discharge device of the type disclosed and claimed in the above-identified copending Adler application. The modified circuit would be identical with that of Figure 1 with the exception that electron-discharge device 26 and diode 33 would be replaced by a single bidirectional switch tube.

Figure 2:
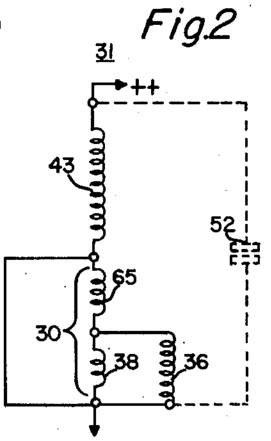
Figure 2 is a simplified equivalent circuit for the circuit of Figure 1 during scanning trace intervals.

Figure 2 schematically represents, in simplified form, the circuit condition which substantially exists during each trace interval, when primary winding 30 of output transformer 31 is substantially short-circuited through device 26 or 33. Actually, there is an effective resistance between the terminals of the primary winding 30 determined by the tube drop across device 26 or 33; this effective resistance may be of the order of 100 ohms and is neglected in the following analysis. High-voltage secondary winding 43 is loaded by an effective distributed capacity 52. Also, the size-control and linearization elements have been omitted in the showing of Figure 2 since these have no substantial effect in the production of those ringing voltages to the elimination of which the invention is directed.

The reasons underlying the production of undesirable ringing voltages are apparent from a consideration of the equivalent circuit of Figure 2. Primary winding 30 is short-circuited during each trace interval. The flyback transient terminating each trace interval sets up a damped oscillation between the leakage inductance of winding 43 and capacity 52 which oscillation carries over into the next trace interval, inducing a corresponding current in primary winding 30. The electromotive force (E. M. F.) originally induced in primary winding 30 by the current in high-voltage secondary winding 43 is opposed by the counter-E. M. F. induced in primary winding 30 by the short-circuit current during the trace interval. The total E. M. F. induced in primary winding 30 due to current in high-voltage secondary winding 43 is always cancelled by the total counter-E. M. F. induced by the short-circuit current, but this condition does not necessarily hold for that portion 38 of primary winding 30 which serves as the sweep-signal output secondary winding. In other words, while the terminals of primary winding 30 are maintained at a common potential during the trace interval, the potential difference between the terminals of secondary winding 38 is not constrained to a zero value, so that the ringing voltages induced in primary winding 30 by transient oscillations in the high-voltage secondary winding 43 may appear across secondary winding 38 and hence across deflection yoke winding 36.

A more rigorous analysis of the conditions existing in the circuit of Figure 2 shows that ringing voltages across secondary winding 38 may be avoided by fulfilling a definite relationship between the circuit constants. For purposes of such analysis the self and mutual inductances of and between the several windings may be defined in the conventional manner. Thus, the self-inductance $L_1$ of primary winding 30 is defined by the relation $$L_1=\frac{E_{11}}{\frac{di_1}{dt}} \tag{1}$$

where $E_{11}$ is the voltage induced across the primary by a change in the current flow $i_1$ therein. Similarly, the mutual inductance $M_{ij}$ between any two of the three windings may be defined by the relation $$M_{ij}=\frac{E_{ji}}{\frac{di_i}{dt}}=\frac{E_{ij}}{\frac{di_j}{dt}} \tag{2}$$

where the subscripts $i$ and $j$ designate the particular windings under consideration. Throughout the following analysis, the subscript 1 is used to designate the primary winding, subscript 2 the output secondary winding (which may in some embodiments consist of a tapped portion of the primary winding), and subscript 3 the high-voltage secondary winding. Thus, for example, the mutual inductance $M_{13}$ between the primary winding and the high-voltage secondary winding may be defined by the relation $$M_{13}=\frac{E_{31}}{\frac{di_1}{dt}}=\frac{E_{13}}{\frac{di_3}{dt}} \tag{3}$$

If, now, periodic ringing currents of a frequency $f$ are considered, it may be shown by known principles of circuit analysis that the voltage $E_1$ appearing across the primary winding is determined in accordance with the equation $$E_1=\omega[I_1L_1+I_2M_{12}+I_3M_{31}] \tag{4}$$

where $\omega$ equals $2\pi f$. $E_1$ must equal zero during trace intervals when ringing voltages should be suppressed, since the terminals of the primary winding are short-circuited through the bidirectional electronic switch. Moreover, since a condition is sought for which no ringing voltage appears across the output secondary winding, $I_2$ must equal zero. Thus, Equation 4 may be simplified as follows:

$$I_1L_1+I_3M_{31}=0 \tag{5}$$

which reduces to $$I_1=\frac{-I_3M_{31}}{L_1} \tag{6}$$

Equation 6 describes the relation between ringing currents in windings 1 and 3 which must prevail if no ringing current is to flow into the output circuit.

By similar analysis, the open-circuit voltage $E_2$ appearing across the output secondary winding is defined by the equation $$E_2=\omega[I_1M_{12}+I_2L_2+I_3M_{32}] \tag{7}$$

Remembering that $I_2$ must equal zero for the desired condition, Equation 7 becomes $$E_2=\omega[I_1M_{12}+I_3M_{32}] \tag{8}$$

Since a condition is sought for which $E_2$ equals zero, $$I_1M_{12}+I_3M_{32}=0 \quad (9)$$

or $$I_1=\frac{-I_3M_{32}}{M_{12}} \quad (10)$$

Combining Equations 6 and 10, $$\frac{-I_3M_{31}}{L_1}=\frac{-I_3M_{32}}{M_{12}} \quad (11)$$

or $$\frac{M_{31}}{M_{32}}=\frac{L_1}{M_{12}} \quad (12)$$

Equation 12 indicates that the appearance of ringing voltages across the output secondary winding is substantially precluded if the ratio between the mutual inductances of the high-voltage secondary winding with respect to the primary and output secondary windings respectively is made substantially equal to the ratio of the self-inductance of the primary winding to the mutual inductance between primary and output secondary windings.

This condition may be specified in another form by reducing Equation 12 to an equivalent equation involving the coupling factors between the several windings. By conventional circuit analysis, $$M_{ij}=k_{ij}\sqrt{L_i}\sqrt{L_j} \quad (13)$$

where $k_{ij}$ is the coupling factor between windings $i$ and $j$. Thus, $$M_{31}=k_{31}\sqrt{L_3}\sqrt{L_1} \quad (14)$$

$$M_{32}=k_{32}\sqrt{L_3}\sqrt{L_2} \quad (15)$$

and $$M_{12}=k_{12}\sqrt{L_1}\sqrt{L_2} \quad (16)$$

Combining Equation 12 with Equations 14, 15, and 16, and reducing to simplest terms, $$\frac{k_{32}}{k_{12}}=k_{31} \quad (17)$$

From Equation 17, it is apparent that, in order substantially to prevent the appearance of ringing voltages across the deflection yoke, it is necessary that the coupling factor $k_{31}$ between the high-voltage secondary winding and the primary winding be made substantially equal to the quotient of the coupling factor $k_{32}$ between the high-voltage secondary and the output secondary and the coupling factor $k_{12}$ between the primary and the output secondary. When it is recalled that the coupling factor between two coils can never exceed unity, it becomes apparent that this condition is tantamount to a requirement that the high-voltage secondary winding be less closely coupled, by a predetermined amount, to the output secondary winding than to the primary winding.

It is to be remembered that the foregoing analysis is predicated upon the equivalent circuit of Figure 2, which assumes a short-circuit across primary winding 30 during trace intervals. As previously mentioned, there is in fact a small resistance determined by the tube drop, so that the conditions specified by Equations 12 and 17 represent only a very close approximation to an optimum condition. For all practical purposes, however, it has been found that if the relationships specified by Equations 12 and 17 are substantially met, the appearance of undesired ringing voltages across the output secondary winding is reduced to such an extent as to have no observable detrimental effect on the constancy of the scanning velocity.

The conditions represented by Equations 12 and 17 are optimum conditions for which, in an ideal circuit, undesired ringing voltages would be completely avoided. Of course, some ringing voltage may be tolerated, and small deviations from the specified conditions may still provide sufficient suppression of ringing voltages to be commercially practicable. In the following analysis, the effect of such small deviations from the optimum condition of Equation 17 on the ringing voltage $E_2$ appearing across the output secondary winding is shown. To simplify the analysis, the open-circuit ringing voltage $E_2$ (with $I_2$ equal to zero) is computed; in all cases, the actual ringing voltage is proportional thereto.

It has been shown that $$E_2=\omega[I_1M_{12}+I_3M_{32}] \quad (8)$$

and $$I_1=\frac{-I_3M_{31}}{L_1} \quad (6)$$

Combining Equations 8 and 6, $$E_2=\omega I_3\left[M_{32}-\frac{M_{31}M_{12}}{L_1}\right] \quad (18)$$

Substituting Equations 14, 15, and 16 in Equation 18 and simplifying, $$E_2=\omega I_3\sqrt{L_2}\sqrt{L_3}[k_{32}-k_{31}k_{12}] \quad (19)$$

For the desired condition, $E_2$ must be less than a value D determined by subjective analysis and representing the limiting value of ringing voltage which may be tolerated without so adversely affecting the circuit performance as to be commercially impractical. It is therefore necessary that $$[k_{32}-k_{31}k_{12}]<C \quad (20)$$

where C is a constant determined by the limiting value of ringing voltage D, since all of the other terms of Equation 19 are fixed by the circuit construction.

Since all the windings are wound on a high-permeability ferromagnetic core, all of the coupling factors $k_{12}$, $k_{31}$, and $k_{32}$ are near unity. Consequently, small deviations in the several coupling factors from the desired condition are reflected as large variations in the value of the binomial term appearing on the left side of relationship (2). Therefore, such deviations in the coupling factors have a large effect on the amount of unsuppressed ringing voltage. In order to obtain an expression of the required relationship in such terms as to show small coupling factor deviations as first-order effects, a new coefficient $\delta_{ij}$, which is a measure of the deficiency from unity coupling and is therefore termed the coupling-deficiency factor between windings $i$ and $j$, may be defined as $$\delta_{ij}=1-k_{ij} \quad (21)$$

Substituting Equation 21 in relation (20) and simplifying, $$[\delta_{12}+\delta_{31}-\delta_{32}-\delta_{31}\delta_{12}]<C \quad (22)$$

The term $\delta_{31}\delta_{12}$ may be discarded as a second-order term, so that relation (22) simplifies to $$[\delta_{12}+\delta_{31}-\delta_{32}]<C \quad (23)$$

From relation (23), it is apparent that in order to reduce the amount of ringing voltage appearing across the output secondary winding to a commercially feasible magnitude, it is necessary that the sum of the coupling-deficiency factor between the primary and the output secondary and the coupling-deficiency factor between the primary and the high-voltage secondary, less the coupling-deficiency factor between the high-voltage secondary and the output secondary, be less than the subjectively predetermined limit C. It has been found, in accordance with the invention, that if this resultant expression is made of a smaller order of magnitude than the largest of the individual coupling-deficiency factors, ringing voltages across the output secondary are precluded to such an extent as to render them negligible. In other words, it is required that

(24) $$|\delta_{12}+\delta_{31}-\delta_{32}|\ll\delta_{max}$$

where $\delta_{max}$ is the largest of the individual coupling-deficiency factors. Relation (24) is to be interpreted as meaning that the absolute value of the expression on the left side of the relation must be of a smaller order of magnitude than the largest of the individual coupling-deficiency factors; it is the absolute value which is significant since the sign of the polynomial affects only the polarity and not the magnitude of the ringing voltage.

Figures 3, 4:
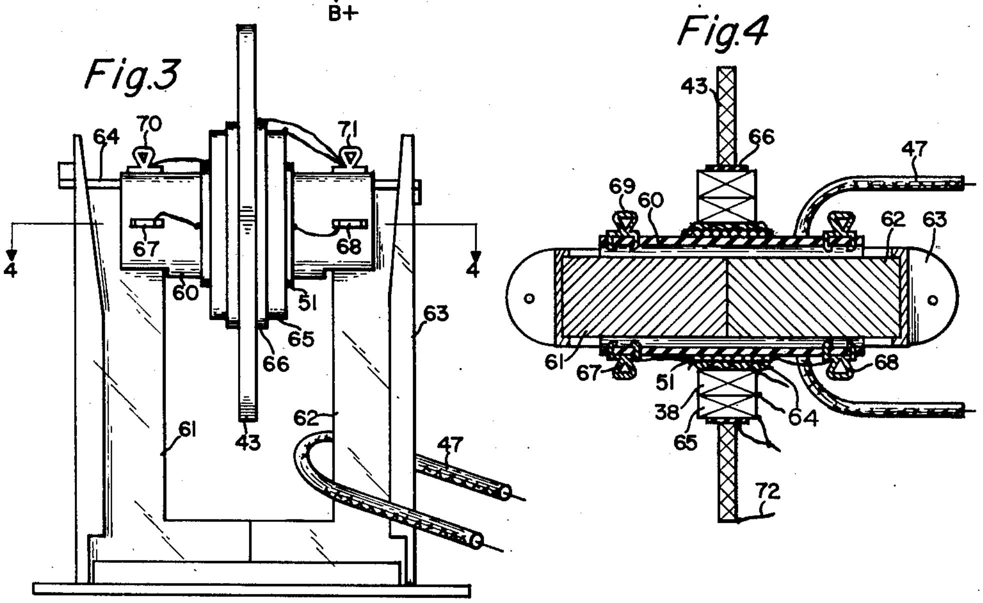
Figure 3 is a side elevation of a conventional output transformer.
Figure 4 is a cross-sectional view taken along the line 4—4 of Figure 3.

Figure 3 is a side elevation of a conventional sweep-signal output transformer of a type presently used in commercial television receivers. The transformer of Figure 3 comprises a coil form 60 encompassing a portion of a bi-partite ferromagnetic core, which may conveniently comprise a pair of juxtaposed U-shaped core members 61 and 62 of high-permeability material supported in a suitable bracket 63. Core members 61 and 62 may be locked in mounting bracket 63 as by means of a metal strip 64 extending between the core and coil form 60 and crimped in place to complete the assembly.

The several windings of the transformer are supported on coil form 60 in a particular physical relation to each other which may most readily be understood from the cross-sectional view of Figure 4. Feedback winding 51 comprises a small number of turns wound directly on coil form 60, and is covered with a thin layer 64 of fabric or other insulating material. The primary winding 30 comprises two substantially identical concentrically wound series-connected winding-sections 38 and 65, and winding-section 38 constitutes the output secondary winding. The high-voltage secondary winding 43 is supported on a second coil form 66 and is arranged concentrically with winding-sections 38 and 65. Feedback winding 51 may be wound as a simple solenoid while winding-sections 38 and 65 and high-voltage secondary winding 43 may conveniently be layer wound or, alternatively, of the universal winding type well known in the art. The heater winding 47 for high-voltage rectifier device 45 may comprise a single loop of heavily insulated wire linking a portion of the ferromagnetic core in a conventional manner. High-voltage secondary winding 43 may advantageously be provided with a wax coating (not shown) to prevent spark discharge and corona.

Coil form 60 is cut away at each end to receive the upright portions of core members 61 and 62, so that a portion at each end of coil form 60 overlaps the upright portions of the respective core members to provide a convenient and compact assembly on which terminal contacts may be supported for connection to the terminals of the several windings. Thus, terminal contacts 67 and 68 may be provided for the terminals of feedback winding 51, contacts 69 and 70 for the terminals of output secondary winding 38, and terminal contact 71 for the high-potential terminal of primary winding 30 and the low-potential terminal of high-voltage secondary winding 43. The high-potential terminal 72 of high-voltage secondary winding 43 may be connected to a contact terminal mounted on an insulating strip (not shown) which may be looped around winding 43. Certain details of the physical construction are specifically disclosed and claimed in the copending application of Richard O. Gray, Serial No. 143,713, filed February 11, 1950, for "Television Receiver Output Transformer," now Patent No. 2,612,545, issued September 30, 1952, and assigned to the present assignee.

Figure 5:
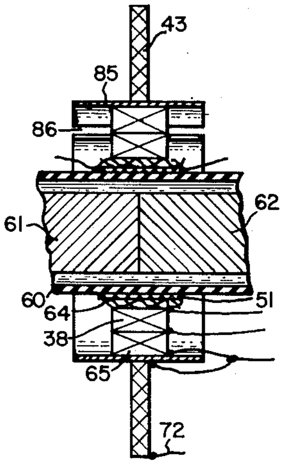
Figure 5 is a fragmentary cross-sectional view, similar to the view of Figure 4, of an embodiment of the invention.

As one embodiment of the invention, ringing voltages may be effectively suppressed by using a transformer constructed as shown in cross-section in Figure 5. In Figure 5, series-connected winding-sections 38 and 65 are concentrically wound with respect to each other and with respect to feedback winding 51, and high-voltage secondary winding 43 is supported concentrically about winding-sections 38 and 65. A ferromagnetic shield 85, in the form of a cylindrical sheet of high-permeability material, is provided between the primary and high-voltage secondary windings. A slit 86 is provided in shield 85 so that shield 85 does not constitute a short-circuited turn. With this arrangement, that portion if the flux produced by high-voltage secondary winding 43, which otherwise would link winding-section 65 but not output secondary winding 38, is effectively intercepted by ferromagnetic shield 85, so that practically all flux which links high-voltage secondary winding 43 with winding-sections 38 and 65 passes through the common ferromagnetic core, thereby linking both the primary and the output secondary equally. Because of the tight coupling between the primary and the output secondary, relation (24) is satisfied.

The embodiment of Figure 5 comprises primary and output secondary windings which are tightly coupled by virtue of being interwound on a common core. In practice, the coupling-deficiency factor $\delta_{12}$ between the primary and the output secondary is usually less than 0.01, a typical value being about 0.005. Consequently, relation (24) is satisfied, and satisfactory ringing voltage suppression is obtained, if

(25) $$|\delta_{31}-\delta_{32}|\ll\delta_{max}$$

The desired coupling relation between the several windings may be achieved in another and preferred manner in accordance with the present invention. In general, it is possible to obtain the desired condition of no ringing voltage across the output secondary winding by tapping the primary winding at any two points of equal ringing potential so that the ringing potential difference is zero. That it is possible to locate two intermediate points of substantially equal ringing potential may be ascertained by using the apparatus of Figure 6 to study the voltage distribution in the primary winding.

Figure 6:
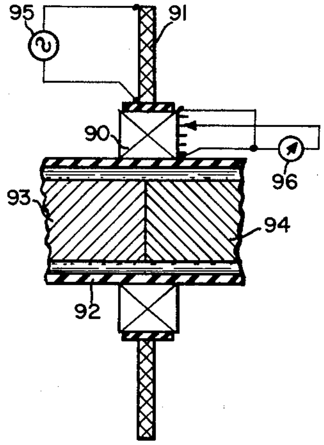
Figure 6 is a fragmentary cross-sectional view of a special transformer, together with schematically shown circuit connections, for illustrating the principles upon which the present invention is based.

In the apparatus of Figure 6, primary and high-voltage secondary windings 90 and 91 are concentrically supported on a coil form 92 which encompasses a ferromagnetic core comprising a pair of juxtaposed core members 93 and 94. The terminals of the high-voltage secondary winding 91 are connected to a suitable signal course 95 to simulate a ringing signal. The terminals of primary winding 90 are short-circuited, and the primary is provided with a number of intermediate taps which may be selectively connected to the primary terminals through a high-impedance voltmeter 96.

Figure 7:
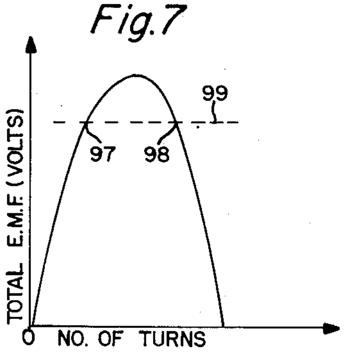
Figures 7 and 8 are graphical representations illustrating certain operating conditions of the transformer of Figure 6.

The voltage distribution in primary winding 90, when the high-voltage secondary winding 91 is excited by a ringing-voltage signal from source 95, is shown in Figure 7, wherein the total E. M. F. across a tapped portion of the primary winding is plotted as a function of the number of turns of primary winding 90 across which the E. M. F. reading is observed. Thus, the total E. M. F. indicated by meter 96 is zero at each terminal of primary winding 90 and follows a continuous curve, exhibiting a maximum somewhat above the mid-point of the primary. Inspection of the curve of Figure 7 indicates that, for any desired number of turns in the output secondary winding, two intermediate taps can be found at which the ringing potentials are equal, so that the ringing potential difference across the output secondary winding is zero. One such example is indicated in Figure 7, the two intermediate taps being located at points on the primary winding designated by the intersections 97 and 98 of a horizontal line 99 with the curve.

Figure 8:
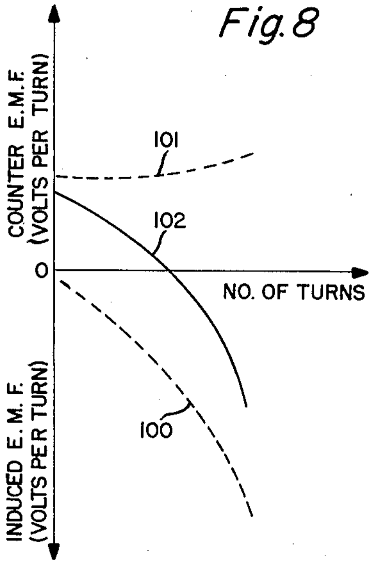

Qualitatively, the voltage distribution indicated by the curve of Figure 7 may be attributed to the fact that the voltage induced by the exciting current in the primary turns adjacent the high-voltage secondary winding is much larger than that induced in more remote turns, while the counter-E. M. F. produced by the short-circuit current in the primary winding is more uniformly distributed. These relations are indicated by the curves of Figure 8, in which the induced E. M. F. per turn attributable to current in the high-voltage secondary winding is represented by curve 100, while the counter-E. M. F. per turn induced by the short-circuit current is represented by curve 101. The net E. M. F. per turn corresponds to the sum of the induced and counter E. M. F.'s and is indicated by curve 102. Integration of curve 102 with respect to the horizontal axis results in the total voltage distribution curve of Figure 7.

Figure 9:
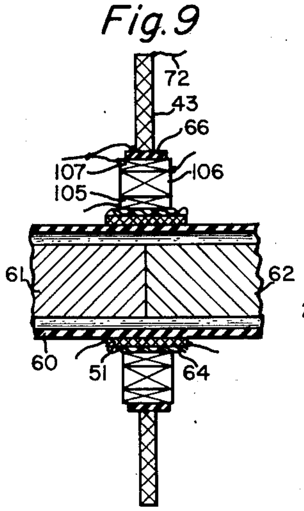
Figure 9 is a fragmentary cross-sectional view of an output transformer constructed in accordance with the invention.

The transformer of Figure 9, in accordance with the invention, is constructed in such a way as to prevent ringing voltages across the deflection yoke by using two intermediate taps on the primary winding to couple the sweep-signals to the deflection yoke. In the transformer of Figure 9, feedback winding 51, covered by fabric layer 64, is again supported on coil form 60. The primary winding comprises three series-connected concentrically wound winding-sections 105, 106, and 107, of which intermediate winding-section 106 constitutes the output secondary winding. The high-voltage secondary winding 43 is supported on coil form 66 concentric with the primary winding. The position of the output secondary winding 106 is determined by relation (24). Viewed in another way, the primary constitutes a single continuous winding having a pair of intermediate taps for coupling output signals to the deflection yoke, and the positions of the intermediate taps are determined, for any given yoke impedance and turns ratio, by relation (24).

Figures 10, 12:
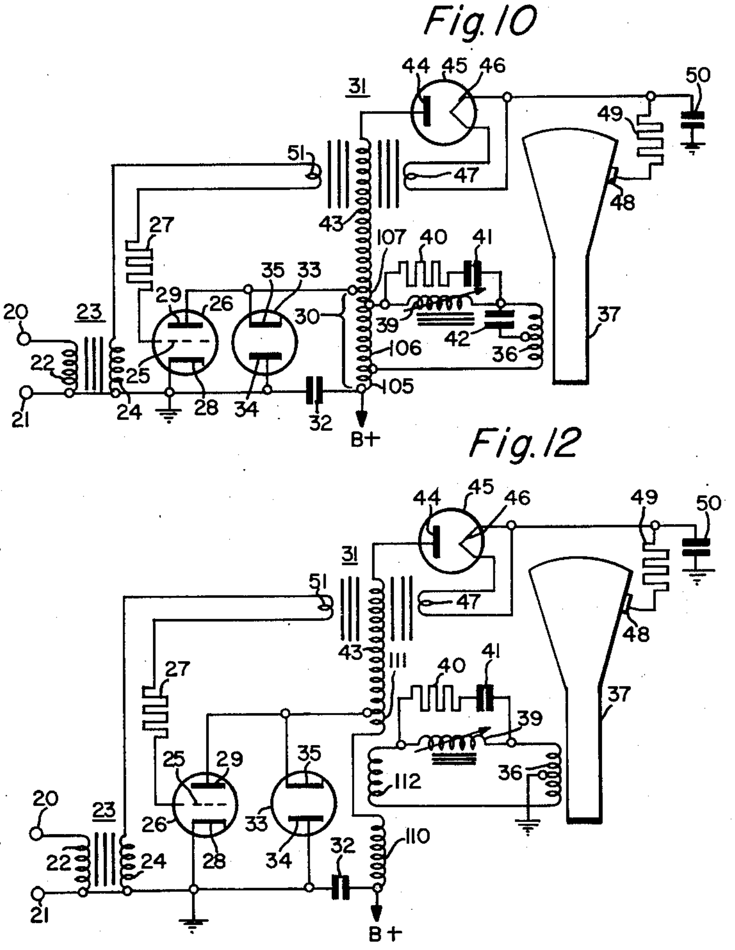
Figure 10 is a schematic circuit diagram, similar to that of Figure 1, of a deflection circuit utilizing the transformer of Figure 9.
Figure 12 is a schematic circuit diagram of a deflection circuit utilizing the transformer of Figure 11.

A deflection circuit in which the transformer of Figure 9 may be used is shown schematically in Figure 10, and is generally similar to the circuit of Figure 1 with the exception that the output secondary winding 106 constitutes an intermediate portion of the primary winding 30.

With the construction of Figure 9, it is possible to balance out undesired ringing voltages with any desired accuracy. However, the deflection yoke 36 (Figure 10) may no longer be grounded, with the result that the detrimental effect of the stray capacity of the yoke on the retrace time and on the high-voltage developed by rectifier device 45 is somewhat greater than would be the case if the yoke were grounded. On the other hand, the autotransformer arrangement of Figure 9 affords particularly good economy in copper volume. In some applications, where it may be desirable to maintain the deflection yoke at a lower potential with respect to ground, it may be desirable to employ a coupling transformer having a separate output secondary winding.

Figure 11:
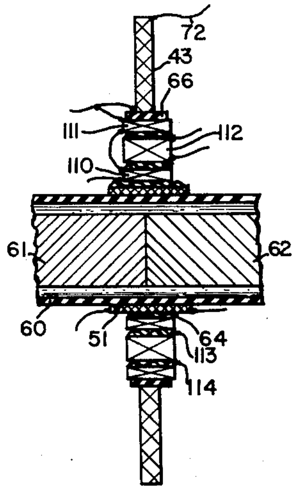
Figure 11 is a fragmentary cross-sectional view of another embodiment of the invention.

Such a construction is illustrated in Figure 11, in which the primary winding constitutes two concentrically wound series-connected winding-sections 110 and 111, and in which a separate output secondary winding 112 is interposed between winding-sections 110 and 111 constituting the primary winding. Thin layers 113 and 114 of fabric or other insulating material may be provided between output secondary winding 112 and winding-sections 110 and 111. In all other respects, the construction of Figure 11 is similar to that of Figure 9.

With the construction of Figure 11, the deflection circuit may be modified as shown in Figure 12, in which the deflection yoke 36 is driven by the separate output secondary winding 112. Since the yoke winding is now insulated from B+, any point on the yoke 36 may be grounded; it may be particularly convenient to ground the center tap between the two halves of the yoke, in which event the fixed condenser ordinarily required across one-half of the yoke may be eliminated. Thus, the somewhat greater cost and larger resistance loss for a given copper volume of the construction of Figure 11 may be balanced to some extent by the elimination of the fixed condenser.

With the arrangement of Figure 11, it is again necessary that the output secondary winding be properly located with respect to the two winding-sections constituting the primary winding so that substantially no ringing potential difference appears across the output secondary winding. Thus, the location of the output secondary 112 is determined by the condition specified in relation (24).

In the embodiments of Figures 9 and 11, the position of the output secondary may be so selected that Equations 12 and 17 are satisfied and ringing voltages are substantially eliminated. However, it is within the scope of the present invention to locate the output secondary winding merely with sufficient accuracy to satisfy relation (24). Because $\delta_{12}$ is normally so small as to be negligible, it is generally sufficient so to construct the transformer that $\delta_{13}$ equals $\delta_{32}$ within the degree of accuracy specified by relation (25).

In the illustrated embodiments of the invention, a feedback winding 51 has been provided for the purpose of supplying negative pulses to the input circuit of the sweep-signal generator during retrace intervals. While it is desirable to feed back negative pulses during retrace intervals, the system is operative and useful without such feedback, and it is therefore to be understood that the provision of feedback winding 51 is not an essential feature of a transformer constructed in accordance with the invention.

Thus, the invention provides a new and improved sweep-signal output transformer for coupling the sweep-signal output stage of a television receiver to a beam-deflection element and to an anode voltage-supply network associated with a cathode-ray image-reproducing device. It has been shown that by satisfying a predetermined coupling relation between the several windings of the output transformer, undesirable ringing voltages may be substantially eliminated or at least reduced to such an extent as to have a negligible effect upon the scanning velocity. In all cases, whether the transformer uses a tapped portion of the primary as output secondary or is provided with a separate output secondary winding, the substantial elimination of ringing voltages is achieved without using either a damper diode or other external compensating elements.

While particular embodiments of the present invention have been shown and described, it is apparent that various changes and modifications may be made, and it is therefore contemplated in the appended claims to cover all such changes and modifications as fall within the true spirit and scope of the invention.

We claim:

1. A transformer comprising: a ferromagnetic core; first and second tightly intercoupled windings each encompassing a portion of said core; and a third winding concentric with said first and second windings and intercoupled therewith in accordance with the relation $$|\delta_{12}+\delta_{31}-\delta_{32}|\ll\delta_{max}$$

where $\delta_{12}$ is the coupling-deficiency factor between said first and second windings, $\delta_{31}$ is the coupling-deficiency factor between said first and third windings, $\delta_{32}$ is the coupling-deficiency factor between said second and third windings, and $\delta_{max}$ is the largest of said coupling-deficiency factors.

2. A transformer comprising: a ferromagnetic core; a first winding encompassing a portion of said core; a second winding comprising a tapped portion of said first winding; and a third winding concentric with said first and second windings; said windings being mutually intercoupled in accordance with the relation $$|\delta_{12}+\delta_{31}-\delta_{32}|\ll\delta_{max}$$

where $\delta_{12}$ is the coupling-deficiency factor between said first and second windings, $\delta_{31}$ is the coupling-deficiency factor between said first and third windings, $\delta_{32}$ is the coupling-deficiency factor between said second and third windings, and $\delta_{max}$ is the largest of said coupling-deficiency factors.

3. A sweep-signal output transformer for coupling the sweep-signal output stage of a television receiver to a beam-deflection element and to an anode voltage-supply network associated with a cathode-ray image-reproducing device, said transformer comprising: a ferromagnetic core; a primary winding encompassing a portion of said core and comprising two adjacent series-connected winding-sections one of which constitutes an output secondary winding which is tightly intercoupled with said primary winding; and a high-voltage winding concentric with said primary winding; said windings being mutually intercoupled in accordance with the relation $$|\delta_{12}+\delta_{31}-\delta_{32}|\ll\delta_{max}$$

where $\delta_{12}$ is the coupling-deficiency factor between said first and second windings, $\delta_{31}$ is the coupling-deficiency factor between said first and third windings, $\delta_{32}$ is the coupling-deficiency factor between said second and third windings, and $\delta_{max}$ is the largest of said coupling-deficiency factors.

4. A sweep-signal output transformer for coupling the sweep-signal output stage of a television receiver to a beam-deflection element and to an anode voltage-supply network associated with a cathode-ray image-reproducing device, said transformer comprising: a ferromagnetic core; a primary winding encompassing a portion of said core and comprising two concentric series-connected winding-sections one of which constitutes an output secondary winding which is tightly intercoupled with said primary winding; and a high-voltage winding concentric with and connected in series with said primary winding; said windings being mutually intercoupled in accordance with the relation $$|\delta_{12}+\delta_{31}-\delta_{32}|\ll\delta_{max}$$

where $\delta_{12}$ is the coupling-deficiency factor between said first and second windings, $\delta_{31}$ is the coupling-deficiency factor between said first and third windings, $\delta_{32}$ is the coupling-deficiency factor between said second and third windings, and $\delta_{max}$ is the largest of said coupling-deficiency factors.

5. A sweep-signal output transformer for coupling the sweep-signal output stage of a television receiver to a beam-deflection element and to an anode voltage-supply network associated with a cathode-ray image-reproducing device, said transformer comprising: a ferromagnetic core; a primary winding encompassing a portion of said core and comprising two concentric series-connected winding-sections one of which constitutes an output secondary winding which is tightly intercoupled with said primary winding; a high-voltage winding concentric with said primary winding; and a ferromagnetic shield between said primary winding and said high-voltage winding; said windings being mutually intercoupled in accordance with the relation $$|\delta_{12}+\delta_{31}-\delta_{32}|\ll\delta_{max}$$

where $\delta_{12}$ is the coupling-deficiency factor between said first and second windings, $\delta_{31}$ is the coupling-deficiency factor between said first and third windings, $\delta_{32}$ is the coupling-deficiency factor between said second and third windings, and $\delta_{max}$ is the largest of said coupling-deficiency factors.

6. A sweep-signal output transformer for coupling the sweep-signal output stage of a television receiver to a beam-deflection element and to an anode voltage-supply network associated with a cathode-ray image-reproducing device, said transformer comprising: a ferromagnetic core; a primary winding encompassing a portion of said core and comprising two concentric series-connected winding-sections one of which constitutes an output secondary winding which is tightly intercoupled with said primary winding; a high-voltage winding concentric with said primary winding; and a slotted tubular ferromagnetic shield between said primary winding and said high-voltage winding; said windings being mutually intercoupled in accordance with the relation $$|\delta_{12}+\delta_{31}-\delta_{32}|\ll\delta_{max}$$

where $\delta_{12}$ is the coupling-deficiency factor between said first and second windings, $\delta_{31}$ is the coupling-deficiency factor between said first and third windings, $\delta_{32}$ is the coupling-deficiency factor between said second and third windings, and $\delta_{max}$ is the largest of said coupling-deficiency factors.

7. A sweep-signal output transformer for coupling the sweep-signal output stage of a television receiver to a beam-deflection element and to an anode voltage-supply network associated with a cathode-ray image-reproducing device, said transformer comprising: a ferromagnetic core; three concentric winding-sections encompassing a portion of said core, at least the inner and outer ones of which winding-sections are series-connected to constitute a primary winding and the intermediate one of which constitutes an output secondary winding mutually intercoupled with said primary winding; and a high-voltage winding concentric with said winding-sections; said windings being mutually intercoupled in accordance with the relation $$|\delta_{12}+\delta_{31}-\delta_{32}|\ll\delta_{max}$$

where $\delta_{12}$ is the coupling-deficiency factor between said first and second windings, $\delta_{31}$ is the coupling-deficiency factor between said first and third windings, $\delta_{32}$ is the coupling-deficiency factor between said second and third windings, and $\delta_{max}$ is the largest of said coupling-deficiency factors.

8. A sweep-signal output transformer for coupling the sweep-signal output stage of a television receiver to a beam-deflection element and to an anode voltage-supply network associated with a cathode-ray image-reproducing device, said transformer comprising: a ferromagnetic core; a primary winding encompassing a portion of said core and comprising three concentric series-connected winding-sections the intermediate one of which constitutes an output secondary winding mutually intercoupled with said primary winding; and a high-voltage winding concentric with said primary winding; said windings being mutually intercoupled in accordance with the relation $$|\delta_{12}+\delta_{31}-\delta_{32}|\ll\delta_{max}$$

where $\delta_{12}$ is the coupling-deficiency factor between said first and second windings, $\delta_{31}$ is the coupling-deficiency factor between said first and third windings, $\delta_{32}$ is the coupling-deficiency factor between said second and third windings, and $\delta_{max}$ is the largest of said coupling-deficiency factors.

9. A sweep-signal output transformer for coupling the sweep-signal output stage of a television receiver to a beam-deflection element and to an anode voltage-supply network associated with a cathode-ray image-reproducing device, said transformer comprising: a ferromagnetic core; a primary winding encompassing a portion of said core; an output secondary winding comprising a tapped intermediate portion of said primary winding; and a high-voltage winding concentric with said primary winding; said windings being mutually intercoupled in accordance with the relation $$|\delta_{12}+\delta_{31}-\delta_{32}|\ll\delta_{max}$$

where $\delta_{12}$ is the coupling-deficiency factor between said first and second windings, $\delta_{31}$ is the coupling-deficiency factor between said first and third windings, $\delta_{32}$ is the coupling-deficiency factor between said second and third windings, and $\delta_{max}$ is the largest of said coupling-deficiency factors.

10. A sweep-signal output transformer for coupling the sweep-signal output stage of a television receiver to a beam-deflection element and to an anode voltage-supply network associated with a cathode-ray image-reproducing device, said transformer comprising: a ferromagnetic core; a primary winding encompassing a portion of said core and comprising two concentric series-connected winding sections; an output secondary winding concentric with said primary winding and supported intermediate said winding sections; and a high-voltage winding concentric with said primary and secondary windings; said windings being mutually intercoupled in accordance with the relation $$|\delta_{12}+\delta_{31}-\delta_{32}|\ll\delta_{max}$$

where $\delta_{12}$ is the coupling-deficiency factor between said first and second windings, $\delta_{31}$ is the coupling-deficiency factor between said first and third windings, $\delta_{32}$ is the coupling-deficiency factor between said second and third windings, and $\delta_{max}$ is the largest of said coupling-deficiency factors.

References Cited in the file of this patent

UNITED STATES PATENTS

| Number | Name | Date |
| --- | --- | --- |
| 2,476,854 | Friend | July 19, 1949 |
| 2,500,766 | Obert et al. | Mar. 14, 1950 |
| 2,513,160 | Friend | June 27, 1950 |
| 2,513,161 | Friend | June 27, 1950 |
| 2,519,224 | Chiles et al. | Aug. 15, 1950 |